Jan. 31, 1939.  C. L. REIMULLER  2,145,432
GYRATORY SIFTER
Filed March 13, 1937  3 Sheets-Sheet 1
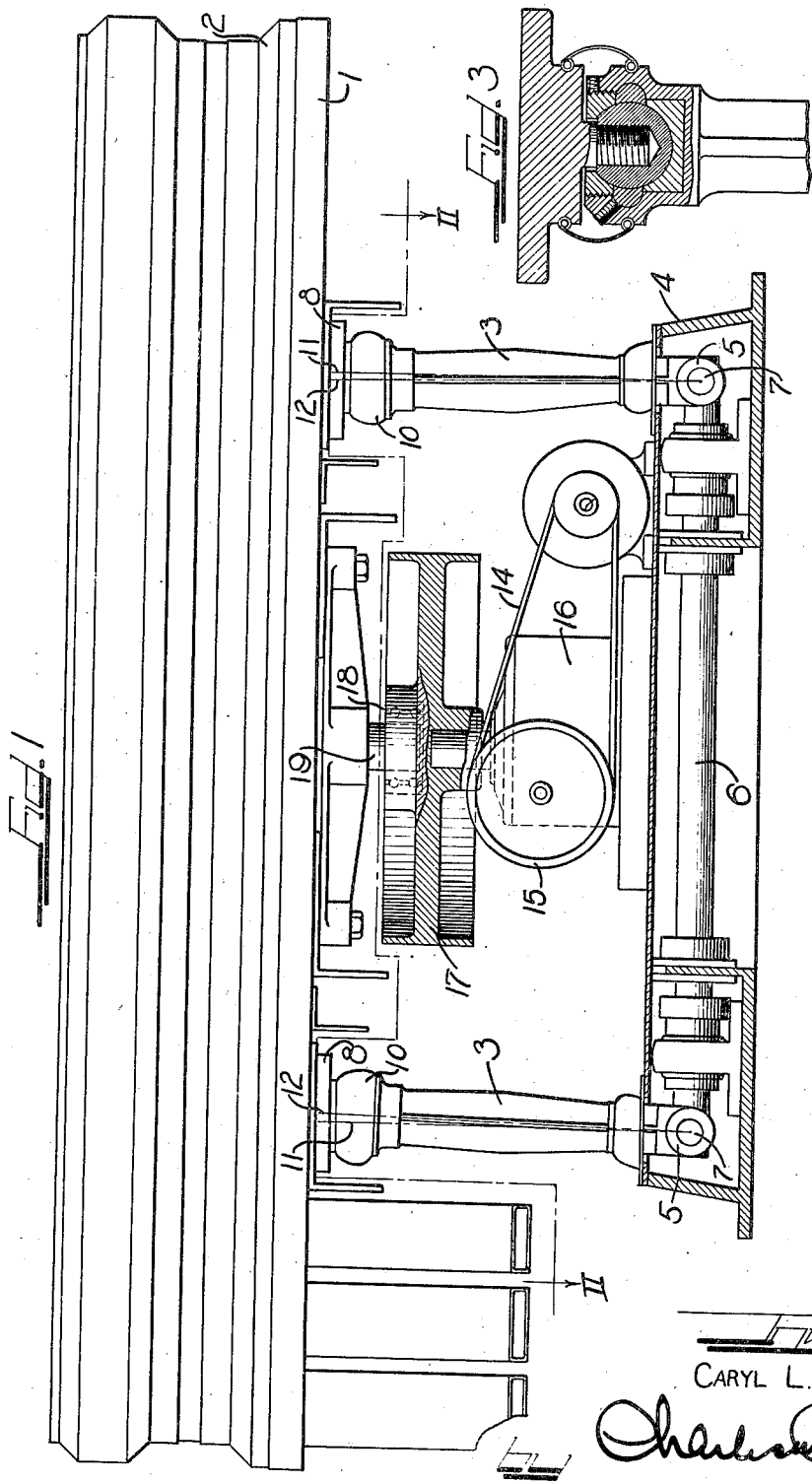
Inventor
CARYL L. REIMULLER

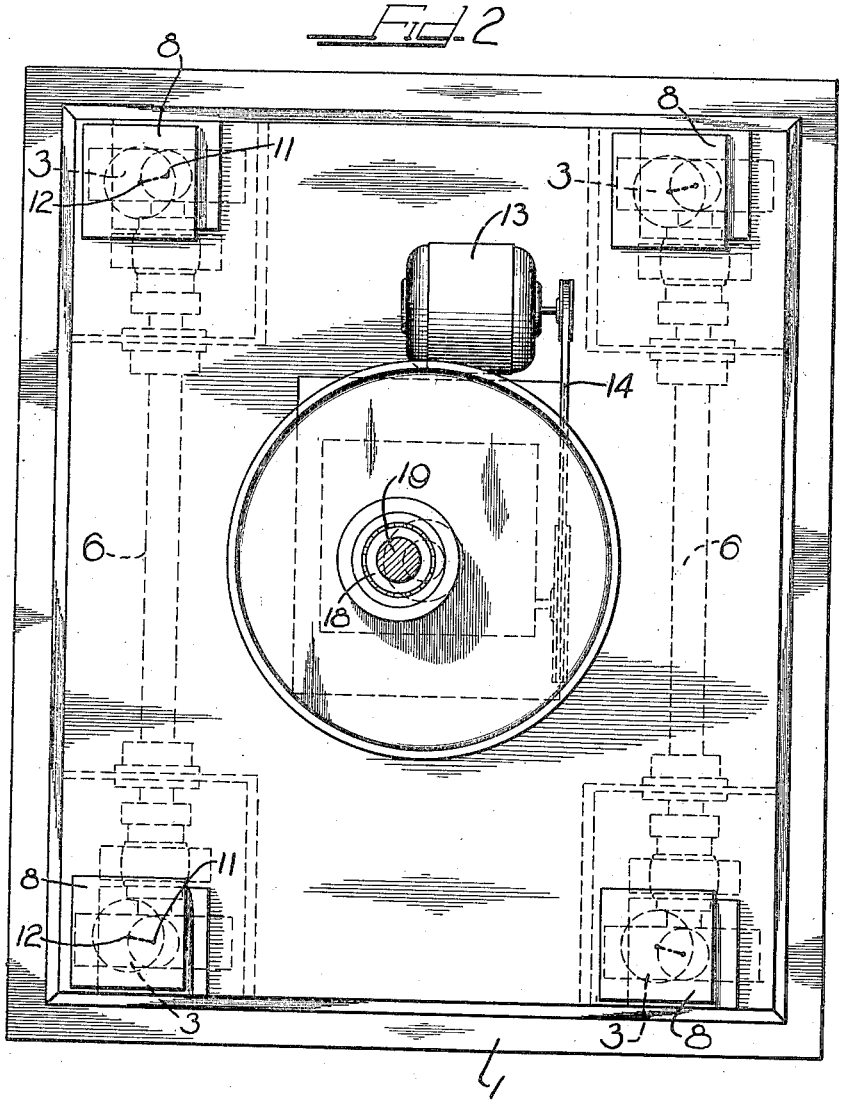

Patented Jan. 31, 1939

2,145,432

UNITED STATES PATENT OFFICE 2,145,432

GYRATORY SIFTER

Caryl L. Reimuller, Chicago, Ill., assignor to B. F. Gump Co., Chicago, Ill., a corporation of Illinois Application March 13, 1937, Serial No. 130,637

3 Claims. (Cl. 209—325)

This invention relates to a gyratory sifter and concerns itself with supporting means that in addition to a gyratory motion also provides for a wavy or up and down motion.

In the past, such gyratory sifters have been maintained level with the result that only a rotary or gyratory motion was imparted thereto. It has been discovered that if the sifter is mounted so that it is given a wavy or up and down motion in addition to a gyratory motion, the efficiency thereof is greatly increased and a materially larger amount of material can be sifted in a given time.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is an elevational view with parts shown in section of a gyratory sifter involving this invention.

Figure 2 is a plan view taken substantially upon the line II—II of Figure 1 looking in the direction of the arrows.

Figure 3 is a fragmentary sectional view illustrating the universal bearing connection at the upper end of the posts.

Figure 4:
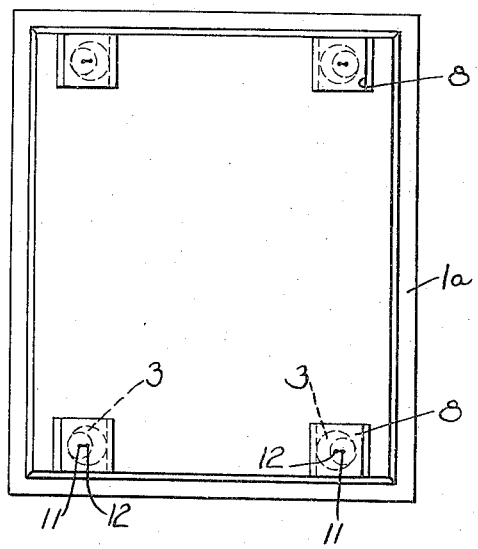
Figures 4 and 5 are reduced diagrammatic views illustrating modified forms of the invention.

According to this invention the sifter is mounted for gyratory movement upon suitable wobble posts which have their upper ends offset from the vertical lines or normals passing through the centers of the lower pivotal connections in the positions shown in Fig. 1 thereof whereby the sifter platform will also partake of a wavy or up and down motion during its gyratory movements.

In the preferred form of the invention, the upper ends of the posts upon each longitudinal side are moved closer together than they are at the bottom as shown in Figures 1 and 2.

Referring now to Figures 1 and 2 of the drawings, it will be observed that there has been illustrated a sifter platform 1 which supports the usual sifter box 2 which may be integral therewith if desired. This platform is supported for gyratory movement upon wobble posts 3 which are pivotally supported upon a base 4.

The wobble posts are provided with yokes 5 at their lower ends which straddle shafts 6 journalled in the base. Pins 7 pivotally connect the yokes with the shaft 6 producing universal joints.

At the bottom of the platform 1 are metal pads 8 that carry spherical bearings 9 journalled in lubricant bearing boxes 10 carried by the upper ends of the posts. The pads 8 on the same side of the platform are placed so that their center points which lie in the axes of the posts are slightly closer together than the distance between the pivot pins 7. In other words, the posts 3 are offset toward each other a distance approximately equal to the distance between lines 11 and 12; lines 11 being vertical lines through the centers of the bearing pins 7 and lines 12 representing the center lines or axes of the posts 3. In Figure 2, the lines 12 are shown in relation to the position of the driving eccentric, and it will be noted that the distance between the upper points of lines 12 is shorter than the distance between the vertical lines 11.

Figure 5:
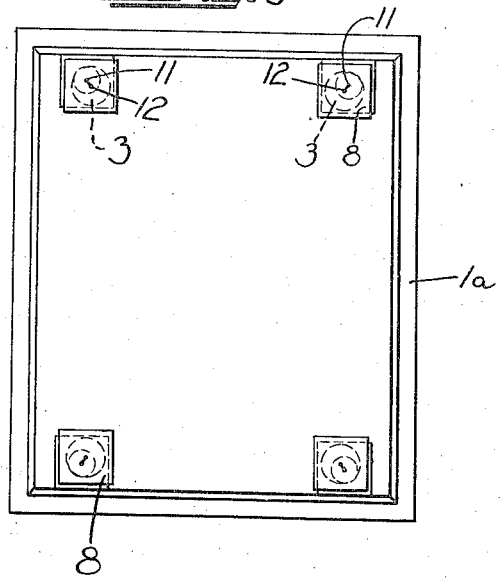

In Figure 4 there is shown in diagrammatic form a sifter platform 1a in which the ends of the posts 3 instead of the side posts are offset toward each other a distance equal to approximately the distance between the lines 11 and 12. In Figure 5, there is shown in diagrammatic form a sifter platform 1a with the upper ends of the posts 3 offset inwardly substantially toward the axis of the driving flywheel or the center of the sifter platform. This arrangement also brings the upper ends of the posts closer together than the lower ends thereof. It will be appreciated that in the different forms illustrated, the lines from the lower pivotal connections of the wobble posts to the centers of gyration of the upper ends thereof are nonperpendicular.

Upon the base 4, there is shown a motor 13 which is geared by means of a belt 14 to a pulley 15 connected to gearing (not shown) in a gear box 16. The gearing in the gear box drives a balance wheel 17 that carries an eccentric drive 18 connected to a wrist pin 19 secured to the bottom of the sifter platform. However any other suitable driving mechanism may be used.

In the operation of the sifter, it will be apparent that the rotary movement will cause the posts 3 to swing, and as the posts are slightly inclined, one pair of posts will be moving toward vertical positions while the other pair is moving to further inclined positions with the result that one end of the sifter box will be slightly elevated while the other end will be slightly depressed causing thereby a wavy or up and down motion.

With any of the arrangements illustrated, it will be apparent that there are always two posts that cause one end or one side of the sifter box to rise, while the other two posts cause the other end or side to be depressed. Of course when the first two posts reach vertical positions, the highest elevation will be reached, and if said posts continue to move slightly beyond such vertical positions, there may be a slight lowering of the sifter box. As the sifter box continues to move, there will be a reverse action of the posts, the first pair moving to inclined positions and the second pair moving to vertical positions. Thus a wavy or up and down motion will be continually imparted to the sifter box.

It will be appreciated that this wavy or up and down motion during the rotation of the sifter box will increase the agitation of the material being sifted and will greatly increase the sifting capacity, for this up and down motion will tend to lift the material and expedite its movements.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a gyratory sifter, a sifter platform, a base, a pair of wobble posts having universal pivotal connection with said base and having universal pivotal connections with said platform the distance between the centers of the pivotal connections in the platform being different than the distance between the centers of the pivotal connections in the base, and a second pair of wobble posts having universal pivotal connections with said base and universal pivotal connections with said platform the distance between the centers of the pivotal connections in the platform of the second pair of wobble posts being different than the distance between the centers of their pivotal connections in the base, whereby each pair of posts have their extremities closer together at one end than at the other, for imparting a wavy or up and down motion to said platform.

2. In a gyratory sifter, a sifter platform, a base, a pair of wobble posts having universal pivotal connections with said base and having universal pivotal connections with said platform the distance between the centers of the pivotal connections in the platform being different than the distance between the centers of the pivotal connections in the base, whereby said pair of posts have their extremities closer together at one end than at the other, and a second pair of wobble posts pivotally connected to said base and platform.

3. In a gyratory sifter, a sifter platform, a base, a shaft journalled in said base, wobble posts pivotally connected to said shaft, and pivotally connected to said platform at points offset from vertical lines passing through the centers of the lower pivotal connections, said wobble posts having their extremities closer together at one end than at the other.

CARYL L. REIMULLER.